US011684188B2

(12) United States Patent
Lord

(10) Patent No.: US 11,684,188 B2
(45) Date of Patent: Jun. 27, 2023

(54) EGG PEELER

(71) Applicant: Charles Lord, Scottsdale, AZ (US)

(72) Inventor: Charles Lord, Scottsdale, AZ (US)

(*) Notice: Subject to any disclaimer, the term of this patent is extended or adjusted under 35 U.S.C. 154(b) by 1036 days.

(21) Appl. No.: 16/209,207

(22) Filed: Dec. 4, 2018

(65) Prior Publication Data
US 2020/0170427 A1 Jun. 4, 2020

(51) Int. Cl.
A47G 19/28 (2006.01)
A23L 15/00 (2016.01)

(52) U.S. Cl.
CPC .............. A47G 19/28 (2013.01); A23L 15/00 (2016.08)

(58) Field of Classification Search
CPC ................. A47G 19/28; A47J 43/14
See application file for complete search history.

(56) References Cited

U.S. PATENT DOCUMENTS

| 4,344,359 A * | 8/1982 | Frechou | A47J 43/145 |
| | | | 99/582 |
| 9,968,211 B2 | 5/2018 | Tyler | |
| 2019/0008201 A1 * | 1/2019 | Ramos | A47J 17/02 |
| 2019/0008298 A1 * | 1/2019 | Gifford | A47G 19/28 |
| 2019/0343311 A1 * | 11/2019 | Tyler | A47G 19/28 |

FOREIGN PATENT DOCUMENTS

DE 202010010705 U1 * 12/2010 ............. A47G 19/28

OTHER PUBLICATIONS

Easy Egg Peeler (@easyeggpeeler8111), Easy Egg Peeler, Nov. 6, 2018, YouTube (Year: 2018).*
Martha and waz67, "BEST way to peel garlic. Thanks Martha.", Jun. 14, 2013, Reddit (Year: 2013).*

* cited by examiner

Primary Examiner — Nathaniel E Wiehe
Assistant Examiner — Spencer H. Kirkwood
(74) Attorney, Agent, or Firm — Culhane Meadows PLLC; Robert C. Klinger

(57) ABSTRACT

An egg peeler that is configured to separate an egg shell of a hard-boiled egg from the white of the egg. The egg peeler includes a receptacle having a cavity and a lid. The receptacle has a side wall including at least one continuous annular shoulder configured to help crush and separate an egg shell of an egg from the egg white when vigorously shaken. The egg peeler is effective, easy to use, inexpensive, and comprises only two parts and thus very easy to manufacture and package.

5 Claims, 5 Drawing Sheets

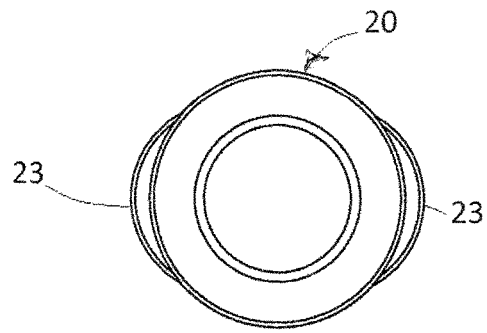
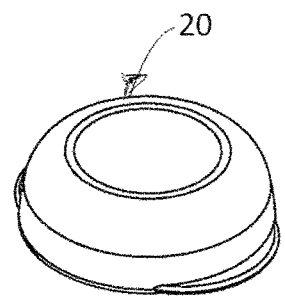
FIGURE 13    FIGURE 12
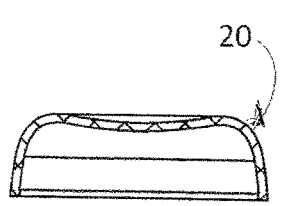
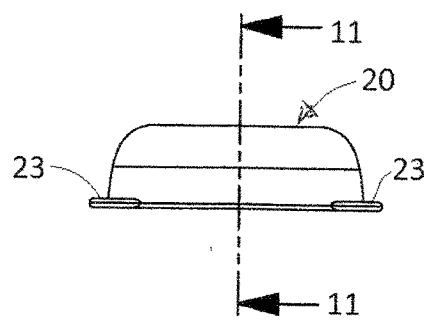
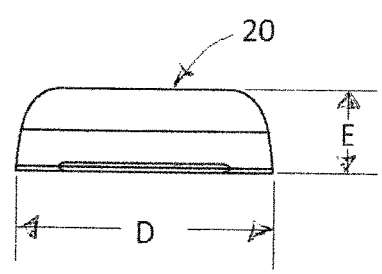
FIGURE 11    FIGURE 9    FIGURE 10
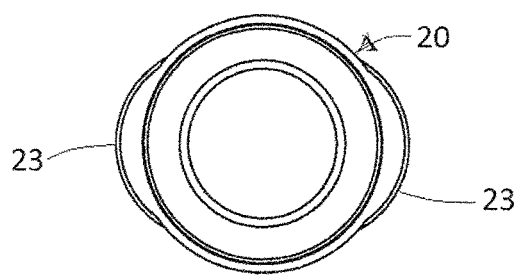
FIGURE 14

EGG PEELER

BACKGROUND

This disclosure is directed to a kitchen accessory, and particularly to an egg peeler used to separate an egg shell of a hard-boiled egg from an egg white.

SUMMARY

An egg peeler that is configured to separate an egg shell of a hard-boiled egg from the egg white. The egg peeler includes a receptacle having a cavity and a selectively attachable lid. The receptacle has a side wall including at least one continuous annular shoulder configured to help crush and separate an egg shell of an egg from the egg while when vigorously shaken. The egg peeler is effective, easy to use, inexpensive, and comprises only two parts and thus is very easy to manufacture and package.

BRIEF DESCRIPTION OF THE DRAWINGS

FIG. 9 is a front elevational view of the lid having a pair of tabs;

FIG. 10 is a side elevational view of the lid having a pair of tabs;

FIG. 11 is a front sectional view of the lid taken along line 11-11 in FIG. 9;

FIG. 12 is a perspective view of the lid;

FIG. 13 is a top view of the lid;

FIG. 14 is a bottom view of the lid; and

DETAILED DESCRIPTION

This disclosure is directed to an egg peeler that is configured to separate an egg shell of a hard-boiled egg from the white of the egg. The egg peeler is effective, easy to use, inexpensive, and comprises only two parts and thus very easy to manufacture and package. The egg peeler is small and suitable for personal use in a household kitchen.

Figure 1:
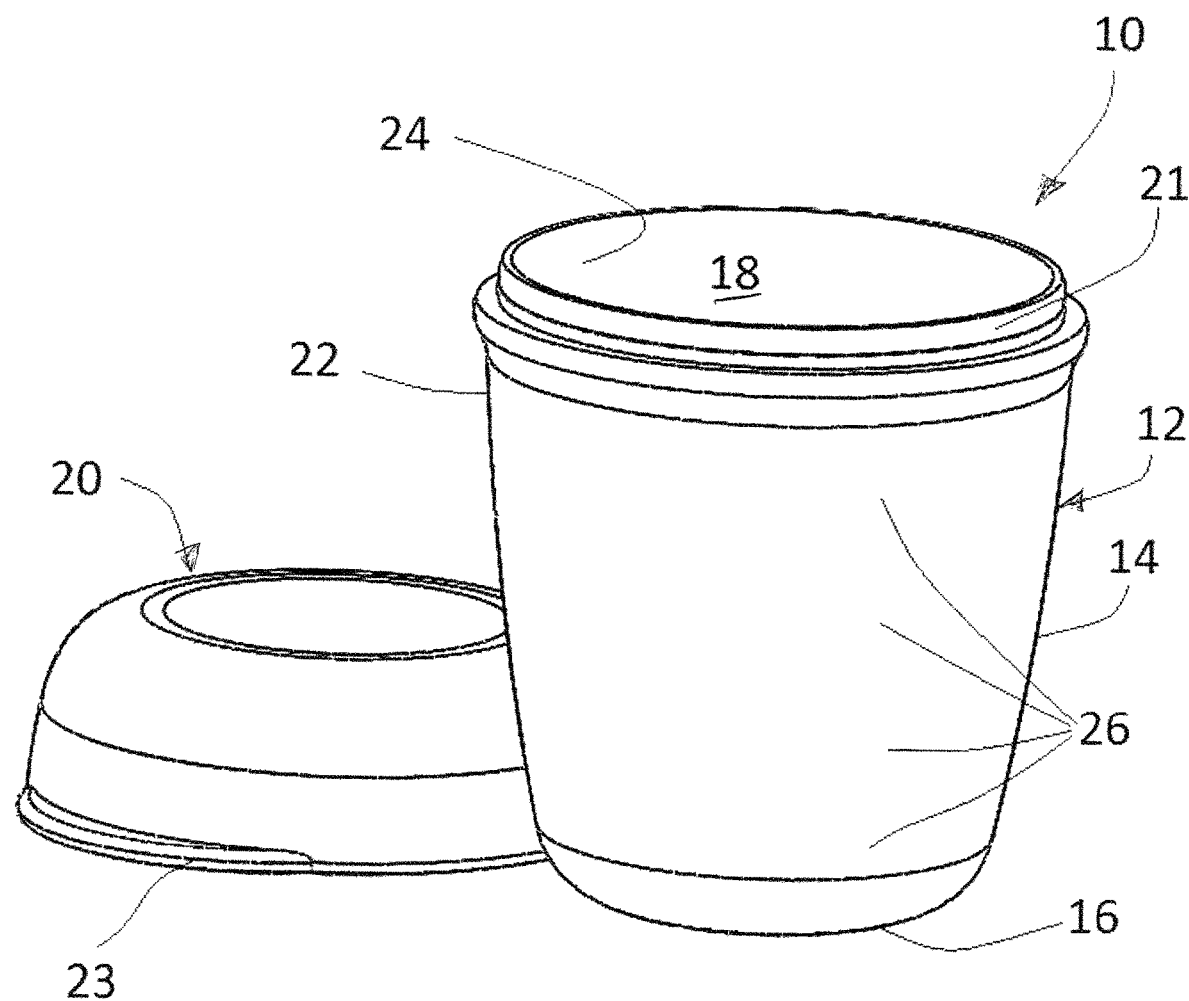
FIG. 1 illustrates u perspective view of an egg peeler including a receptacle and lid.

Referring to FIG. 1, there is shown an egg peeler 10 including a receptacle 12 having an annular side wall 14 and a bottom 16 formed integral to receptacle 12 and together forming a cavity 18. The cavity 18 is seen to be formed by the side wall 14 tapering outwardly from the bottom 16, such that the receptacle inner wall 14 is convex. The receptacle 12 is formed of a hard material, such as glass, plastic, acrylic, metal etc. and may be clear to allow viewing of the cavity 18, including an egg therein as shown in FIG. 13.

A round cup-shaped lid 20 is configured to be sealingly and selectively secured to a rim 21 at a top portion 22 of the receptacle 12 to completely enclose the cavity 16. The lid 20 can he secured to the receptacle 12 such as by snapping the edge of the lid 20 about the rim 21. The lid 20 has a pair of opposing tabs 23 extending from the lid edge and are configured to help snap the lid about the rim 21, and also un-snap the lid 20 and remove it from the receptacle 14. Alternatively, the lid 20 can be threadably attached to the receptacle 14 upon rotation of the lid 20 to threads defined at the rim 21. The lid 20 may have a seal or gasket, and may be made of a resilient material to allow the lid 20 to flex about the rim 21 to completely enclose the cavity 18 and seal the cavity 18.

Figure 2:
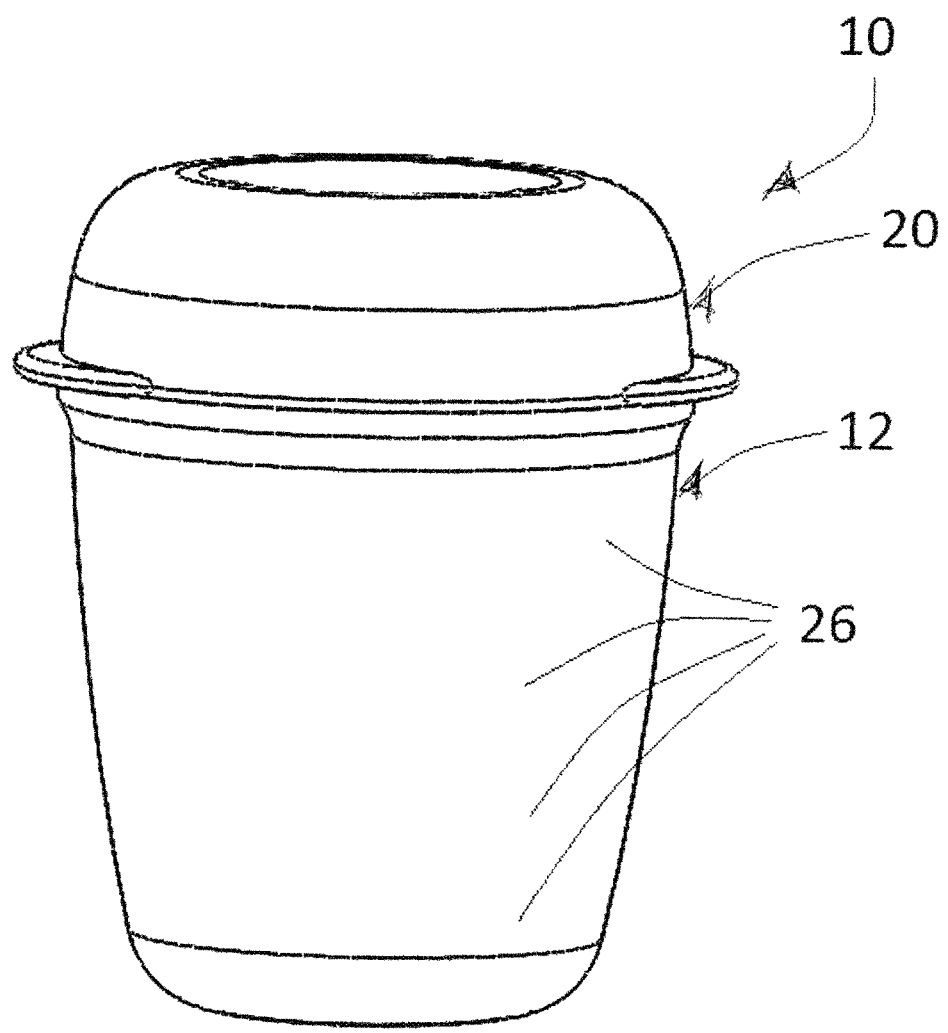
FIG. 2 illustrates the egg peeler of FIG. 1 with the lid attached to the body to create a completely enclosed cavity.

FIG. 2 shows the lid 20 assembled to the receptacle 12 and scaled to prevent any fluid, such as water, from escaping the cavity 18 when disposed therein.

Figure 5:
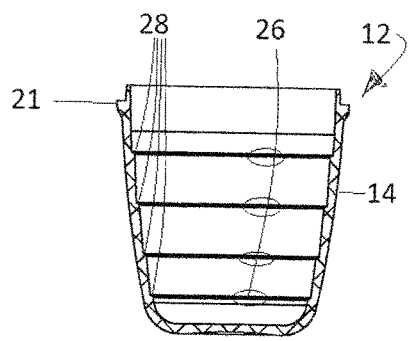
FIG. 5 is a front sectional view of the receptacle taken along line 5-5 in FIG. 3.
Figure 3:
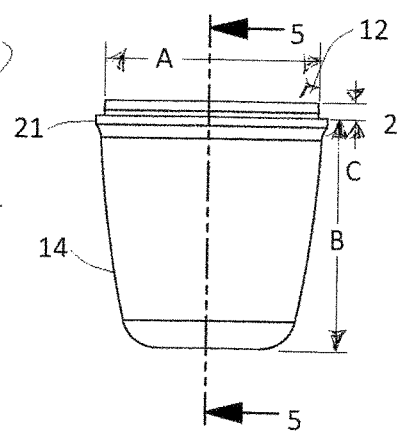
FIG. 3 is a front elevational view of the receptacle.
Figure 4:
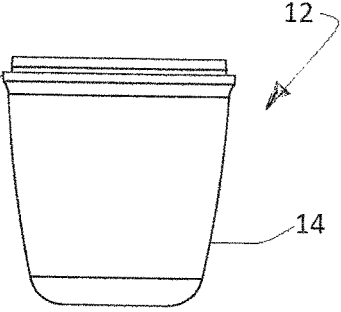
FIG. 4 is a side elevational view of the receptacle.

As shown in FIGS. 1 and 2 in ghost lines, and shown in further detail in FIGS. 3-7, the side wall 14 is further seen to have a plurality of integrally formed and continuous annular shoulders 26, creating a stair-case like inner surface 24. FIG. 3 is a front elevational view of the receptacle 12, FIG. 4 is a side elevational view of the receptacle 12, and FIG. 5 illustrates a front sectional view taken along line 5-5 in FIG. 3 showing the evenly spaced continuous annular shoulders 26 formed integral to the side wall 14. The annular shoulders 26 each have a ledge forming an annular upper surface 28. In the shown embodiment, there are four (4) shoulders 26, although the number of shoulders 26 can be greater or less than illustrated und limitation to the number of shoulders 26 shown in the illustrative embodiment is not to be inferred.

Figure 6:
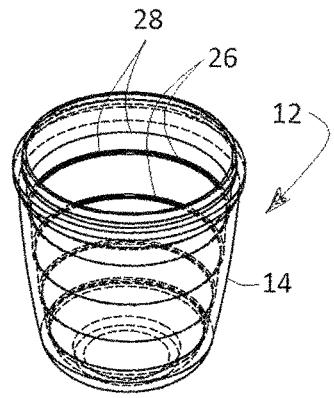
FIG. 6 is a perspective view of the receptacle.

FIG. 6 illustrates a top perspective view of the receptacle 12 illustrating the top surfaces of the continuous annular shoulders 26.

Figure 7:
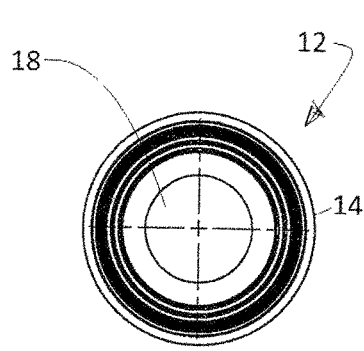
FIG. 7 is a top view of the receptacle.

FIG. 7 illustrates a top view of the receptacle 12 also showing the upper surfaces 28 of the continuous annular shoulders 26.

Figure 8:
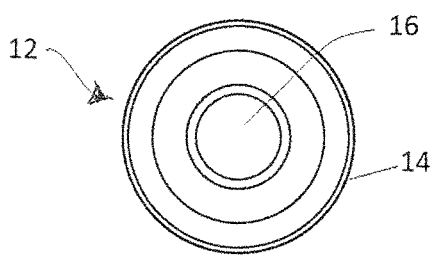
FIG. 8 is a bottom view of the receptacle.

FIG. 8 illustrates a bottom view of the receptacle 12.

FIG. 9 is a from elevational view of the lid 20 having a tab.

FIG. 10 is a front elevational view of the lid 20 having a tab.

FIG. 11 is a front sectional view of the lid 20 taken along line 11-11 in FIG. 9.

FIG. 12 is a perspective view of the lid 20.

FIG. 13 is a lop view of the lid 20.

FIG. 14 is a bottom view of the lid 20.

Figure 15:
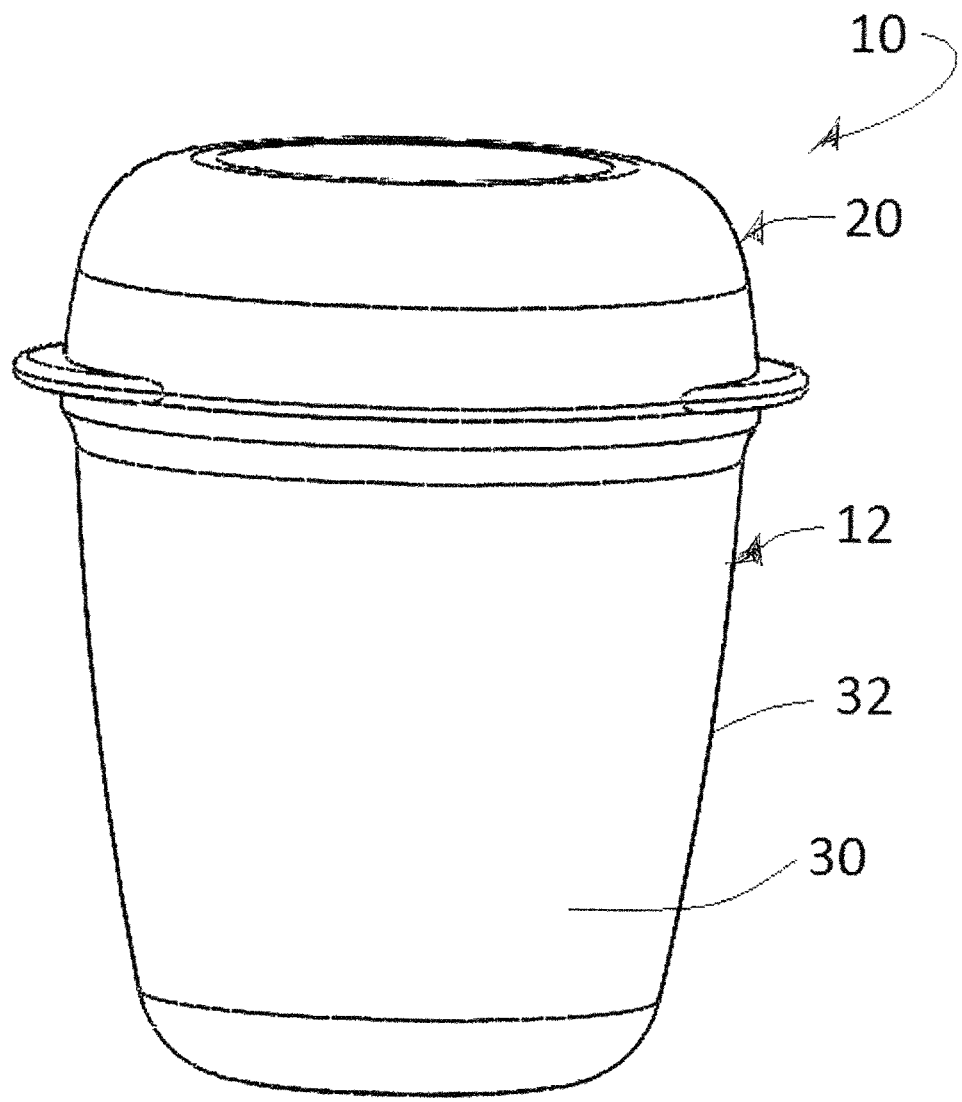
FIG. 15 is a perspective view of the receptacle containing an egg and the lid attached.

Referring now to FIG. 15, there is shewn the egg peeler 10 containing a conventional commercial hen egg 30 in the cavity 18. The cavity 18 further contains a fluid such as a portion of water 32, and the lid 20 secured to the top of the receptacle 12 to seal and completely enclose the egg 30 in the cavity 18. The portion of water 32 may take up, for example, about half of the remaining volume of the cavity 18 with the egg 30 positioned vertically in the cavity 18.

The egg peeler 10 is used by first vertically placing the hard-boiled egg 30 in the cavity 18 of the open receptacle 12, Next, the portion of water 32 is poured into the receptacle 12 such that it is disposed about the lower portion of the egg 30. Next, the user attaches the lid 20 to the rim 21 of the receptacle 12 to seal the egg 30 and portion of water 32 within the cavity 18. The user then vigorously shakes the egg peeler 10 vertically, like making a martini, such that the annular shoulders 26 violently engage the egg shell to help crush the shell and separate the shell from the egg white. The portion of water 32 helps lubricate the egg shell to help separate the egg shell from the egg white. Finally, the lid 20 is removed, the egg white is removed from the receptacle 16, or simply poured out, and the crushed egg shell remains which are only small particles are discarded.

In one illustrative embodiment, the following dimensions of egg peeler 10 may be used. The outermost diameter of the rim 21 may be 3.01 inches, the height of the receptacle 12 shown at dimension 13 may be 3.00 inches, dimension C may be 0.15 inches, the outermost diameter of the lid 20 shown at dimension D may be 2.99 inches, and the height of the lid 20 shown at dimension E may be 0.97 inches. Of course, other dimensions are contemplated by this disclosure.

The foregoing disclosure has been set forth merely to illustrate the disclosure and is not intended to be limiting. It will be appreciated that modifications, variations and additional embodiments are covered by the above teachings and within the purview of the appended claims without departing from the spirit and intended scope of the disclosure. Since modifications of the disclosed embodiments incorporating the spirit and substance of the disclosure may occur to persons skilled in the art, the disclosure should be construed to include everything within the scope of the appended claims and equivalents thereof.

I claim:

1. A method of separating a shell of a lard-boiled egg from egg white using an egg peeler comprising:

a body having an annular side wall having a stair-case like inner surface tapering inwardly from an upper portion of the body to a bottom and together forming a receptacle having a cavity, wherein the stair-case like inner surface has ledges forming annular upper surfaces that are flat, and face upwardly without obstruction and angle downwardly towards the bottom;

a lid configured to selectively secure to the body to sealingly enclose the cavity; and wherein the stair-case like inner surface further comprises a plurality of continuous annular shoulders configured to engage the hard-boiled egg placed in the cavity when the egg peeler is shaken, comprising the steps of:

placing a hard-boiled egg having an eggshell and an egg white in the receptacle cavity;

adding water to the cavity;

sealingly securing the lid to body;

shaking the egg peeler such that the hard-boiled egg, engages both the annular upper surfaces of the ledges and the continuous annular shoulders to separate the eggshell from the egg white; and removing the egg white from the receptacle.

2. The method as specified in claim 1 wherein at least one of the plurality of continuous annular shoulders has a diameter larger than a diameter of the hard-boiled egg.

3. The method as specified in claim 1 wherein a portion of the annular sidewall below each respective ledge has a smaller diameter than a portion of the annular sidewall above the respective ledge.

4. The method as specified in claim 1 wherein the body is comprised of a clear material.

5. The method as specified in claim 1 wherein the receptacle has a rim, wherein the lid is snapped about the rim and to the receptacle.

\* \* \* \* \*